United States Patent
Perkins

(10) Patent No.: US 8,443,945 B2
(45) Date of Patent: May 21, 2013

(54) VEHICLE CHOCKING SYSTEMS AND METHODS OF USING THE SAME

(75) Inventor: Blair Charles Perkins, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 456 days.

(21) Appl. No.: 12/786,878

(22) Filed: May 25, 2010

(65) Prior Publication Data

US 2011/0290596 A1    Dec. 1, 2011

(51) Int. Cl.
*B60T 3/00* (2006.01)
(52) U.S. Cl.
USPC ....... 188/32; 188/36; 188/1.11 R; 188/1.11 E
(58) Field of Classification Search
USPC ............ 188/32, 36, 1.11 R, 1.11 E; 414/401, 414/30; 303/122.03
See application file for complete search history.

(56) References Cited

U.S. PATENT DOCUMENTS

| | | | | |
|---|---|---|---|---|
| 3,824,536 A | * | 7/1974 | Cherico | 340/436 |
| 4,122,629 A | * | 10/1978 | Rennick | 49/357 |
| 5,388,937 A | * | 2/1995 | Farsai | 410/9 |
| 5,831,540 A | * | 11/1998 | Sullivan et al. | 340/679 |
| 6,336,527 B1 | * | 1/2002 | Metz | 188/32 |
| RE37,570 E | | 3/2002 | Springer et al. | |
| 6,505,713 B1 | | 1/2003 | Paul et al. | |
| 6,727,805 B2 | | 4/2004 | Hollister et al. | |
| 6,781,516 B2 | | 8/2004 | Reynard et al. | |
| 6,975,226 B2 | | 12/2005 | Reynard et al. | |
| 7,032,720 B2 | * | 4/2006 | Jette et al. | 188/36 |
| 7,226,265 B2 | * | 6/2007 | Wilson | 414/401 |
| 7,256,703 B2 | | 8/2007 | Duvernell et al. | |
| 7,264,092 B2 | * | 9/2007 | Jette | 188/36 |
| 7,274,300 B2 | | 9/2007 | Duvernell et al. | |
| 8,286,757 B2 | * | 10/2012 | Nelson | 188/4 R |
| 2003/0007850 A1 | | 1/2003 | Belongia et al. | |
| 2006/0181391 A1 | | 8/2006 | McNeill et al. | |
| 2008/0042865 A1 | | 2/2008 | Shephard et al. | |

* cited by examiner

*Primary Examiner* — Robert A Siconolfi
*Assistant Examiner* — James Hsiao
(74) *Attorney, Agent, or Firm* — Dinsmore & Shohl LLP

(57) ABSTRACT

Vehicle chocking systems include a first chock comprising a first bottom surface, a first front wheel restraining surface and a first rear wheel restraining surface opposite the first front wheel restraining surface, a second chock comprising a second bottom surface, a second front wheel restraining surface and a second rear wheel restraining surface, wherein the first bottom surface, the first front wheel restraining surface and the first rear wheel restraining surface of the first chock and the second bottom surface, the second front wheel restraining surface and the second rear wheel restraining surface of the second chock each comprises a proximity sensor, wherein the proximity sensors are communicatively coupled to a controller comprising a processor and a memory having a computer readable and executable instruction set to determine if the proximity sensors for each of the first bottom surface, the second bottom surface and opposing wheel restraining surfaces are engaged.

20 Claims, 7 Drawing Sheets

VEHICLE CHOCKING SYSTEMS AND METHODS OF USING THE SAME

TECHNICAL FIELD

The present specification generally relates to chocks for securing a wheel and, more specifically to vehicle chocking systems for verifying the proper securement of a wheel.

BACKGROUND

Vehicles such as trucks are often backed up to loading bays or warehouse entrances such that cargo may be loaded or unloaded between the two. In some instances, a loading ramp may be lowered into a loading position to enable loading bay workers or vehicles to pass between the cargo area of the vehicle and the loading bay. However, such loading and unloading may impart significant force on the vehicle causing the vehicle to move away from the loading bay thereby separating the vehicle from the loading bay. Additionally, the physical surroundings of where the vehicle is parked (such as a sloped surface or gravel surface) may also cause the vehicle to move when loading and unloading occurs. In an attempt to secure the vehicle, chocks are sometimes positioned in front of and behind a wheel of the vehicle to inhibit unwanted vehicle movement. However, these chocks may become displaced or otherwise improperly positioned about the wheel without the knowledge of the loading bay workers. Furthermore, loading bay workers may forget or fail to verify the proper securement of the chocks about the wheel.

Accordingly, a need exists for alternative systems for verifying a wheel is properly secured prior to loading or unloading cargo from a vehicle.

SUMMARY

In one embodiment, a vehicle chocking system may include a first chock comprising a first bottom surface, a first front wheel restraining surface and a first rear wheel restraining surface opposite the first front wheel restraining surface, a second chock comprising a second bottom surface, a second front wheel restraining surface and a second rear wheel restraining surface opposite the second front wheel restraining surface, wherein the first bottom surface, the first front wheel restraining surface and the first rear wheel restraining surface of the first chock and the second bottom surface, the second front wheel restraining surface and the second rear wheel restraining surface of the second chock each comprises a proximity sensor, and wherein each of the proximity sensors are communicatively coupled to a controller The controller may include a processor and a memory having a computer readable and executable instructions and the processor executes the computer readable and/or executable instructions to transmits an approval signal when proximity sensors for the first bottom surface and the second bottom surface are both engaged, and either proximity sensors for the first rear wheel restraining surface and the second front wheel restraining surface are both engaged or proximity sensors for the first front wheel restraining surface and the second rear wheel restraining surface are both engaged.

In another embodiment, a vehicle chocking system may include a first chock comprising a first bottom surface with a first bottom surface proximity sensor, a first front wheel restraining surface with a first front wheel restraining surface proximity sensor, and a first rear wheel restraining surface with a first rear wheel restraining surface proximity sensor, a second chock comprising a second bottom surface with a second bottom surface proximity sensor, a second front wheel restraining surface with a second front wheel restraining surface proximity sensor, and a second rear wheel restraining surface with a second rear wheel restraining surface proximity sensor, and a controller communicatively coupled to the first bottom surface proximity sensor, the first front wheel restraining surface proximity sensor, the first rear wheel restraining surface proximity sensor, the second bottom surface proximity sensor, the second front wheel restraining surface proximity sensor, and the second rear wheel restraining surface proximity sensor. The controller may include a processor and a memory having a computer readable and executable instructions and the processor executes the computer readable and/or executable instructions to transmits an approval signal when the first bottom surface proximity sensor and the second bottom surface proximity sensor are both engaged, and either the first rear wheel restraining surface proximity sensor and the second front wheel restraining surface proximity sensor are both engaged or the first front wheel restraining surface proximity sensor and the second rear wheel restraining surface proximity sensor are both engaged.

In yet another embodiment, a method for verifying proper wheel securement may include providing a first chock comprising a first bottom surface with a first bottom surface proximity sensor, a first front wheel restraining surface with a first front wheel restraining surface proximity sensor, and a first rear wheel restraining surface with a first rear wheel restraining surface proximity sensor, providing a second chock comprising a second bottom surface with a second bottom surface proximity sensor, a second front wheel restraining surface with a second front wheel restraining surface proximity sensor, and a second rear wheel restraining surface with a second rear wheel restraining surface proximity sensor, determining if either the first front wheel restraining surface proximity sensor and the second rear wheel restraining surface proximity sensor are both engaged or the first rear wheel restraining surface proximity sensor and the second front wheel restraining surface proximity sensor are both engaged, and sending an approval signal to verify proper securement of the wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
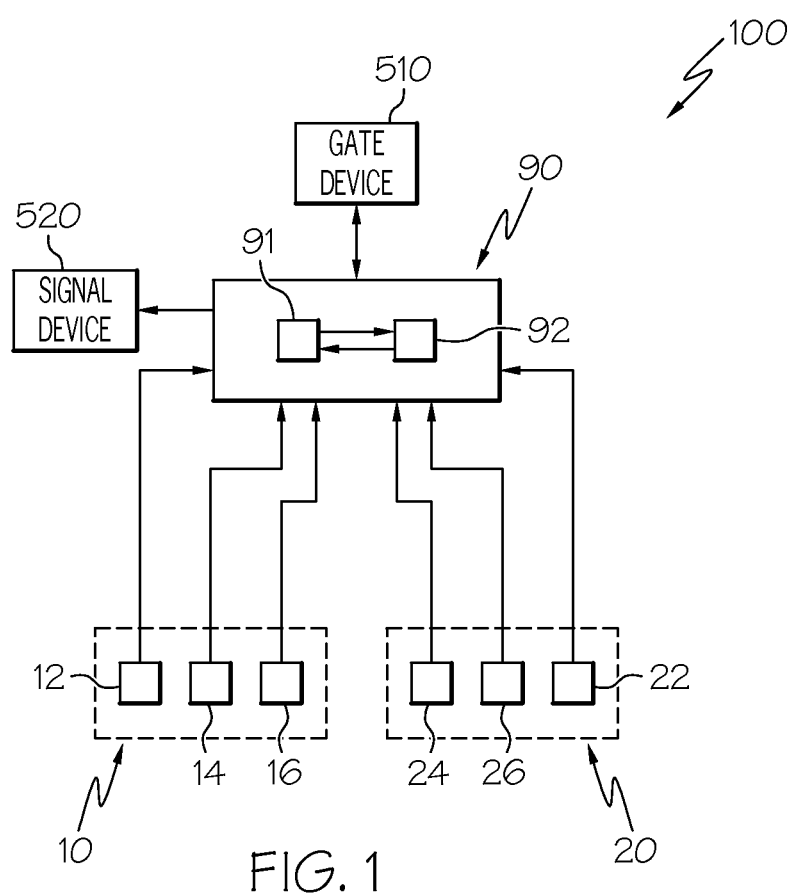
FIG. 1 depicts a schematic of a vehicle chocking system according to one or more embodiments shown and described herein.

FIG. 1 schematically depicts a vehicle chocking system for a wheel of a vehicle docked at a loading bay. The vehicle chocking system generally comprises a first chock and the second chock communicatively coupled to a controller. Both the first chock and the second chock comprise a plurality of proximity sensors. When the first chock and the second chock are placed about a wheel of a vehicle, the controller determines whether the wheel is properly secured (i.e. that a chock is both in front and behind the wheel) by verifying that two of the three proximity sensors for each chock are activated. When the chocks are properly positioned the controller sends an approval signal indicating that loading or unloading of cargo from the vehicle may occur. Various embodiments of the vehicle chocking system and methods of using the vehicle chocking system will be described in more detail herein.

Referring to the vehicle chocking system 100 schematically depicted in FIG. 1, the solid lines and arrows generally indicate the interconnectivity between various components of the vehicle chocking system 100. The solid lines and arrows also generally indicate the propagation of electrical signals, such as data signals, control signals and the like, between various components of the vehicle chocking system 100. In the embodiments described herein, the interconnectivity between various components is achieved by wired connections. However, it should be understood that the connections between various components may be either wired, wireless or various combinations thereof.

Still referring to FIG. 1, the vehicle chocking system 100 generally comprises a first chock 10, a second chock 20, and a controller 90. The first chock 10 generally comprises a first plurality of proximity sensors 12, 14, 16. Specifically, the first chock 10 comprises a first bottom surface proximity sensor 12, a first front wheel restraining surface proximity sensor 14 and a first rear wheel restraining surface proximity sensor 16. Similarly, the second chock 20 comprises a second plurality of proximity sensors 22, 24, 26. As with the first chock 10, the proximity sensors of the second chock 20 include a second bottom surface proximity sensor 22, a second front wheel restraining surface proximity sensor 24 and a second rear wheel restraining surface proximity sensor 26. The proximity sensors of the first chock 10 and the second chock 20 are communicatively coupled to the controller 90.

Figure 2:
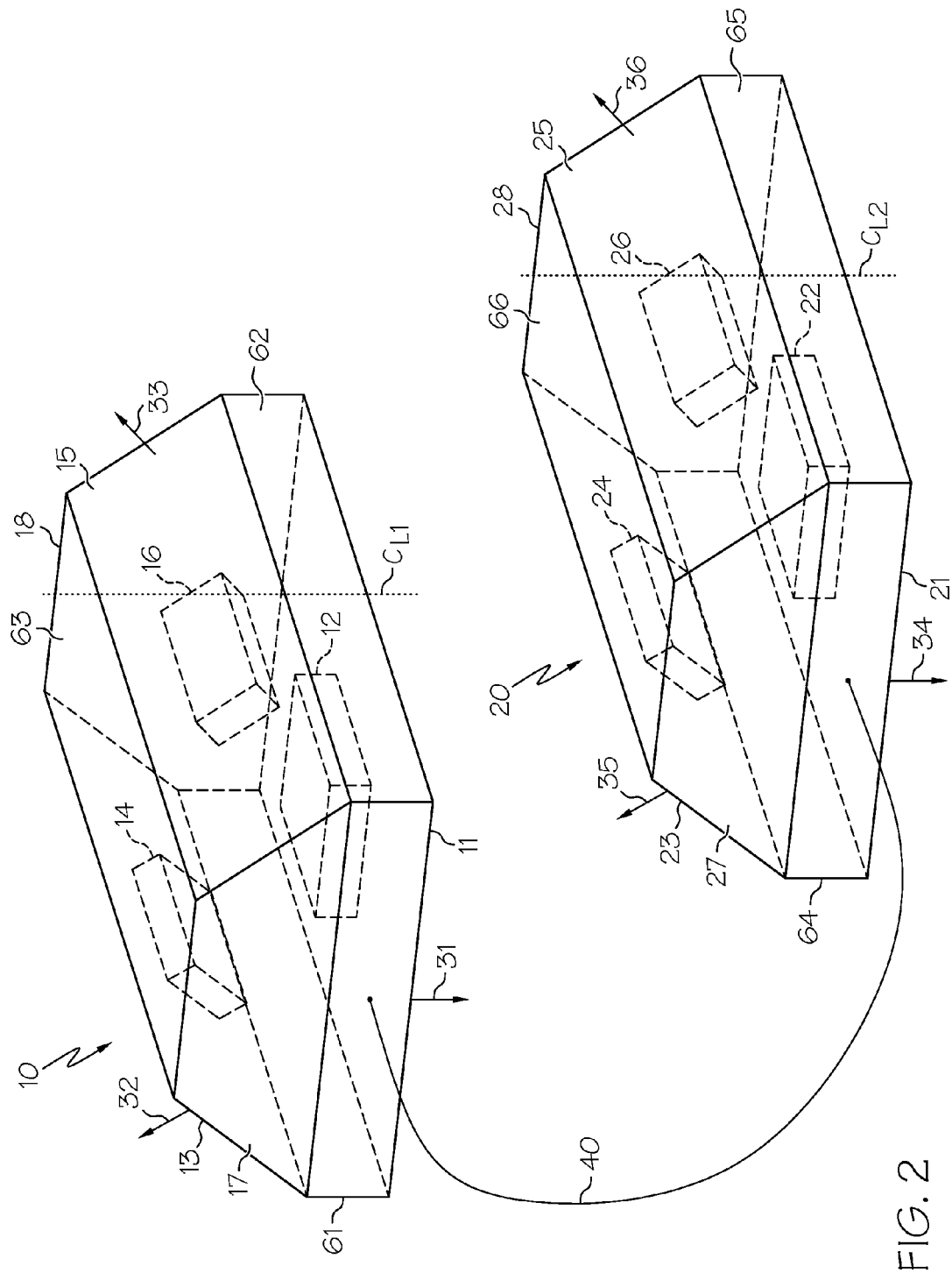
FIG. 2 depicts a first chock and a second chock of a vehicle chocking system according to one or more embodiments shown and described herein.
Figure 3:
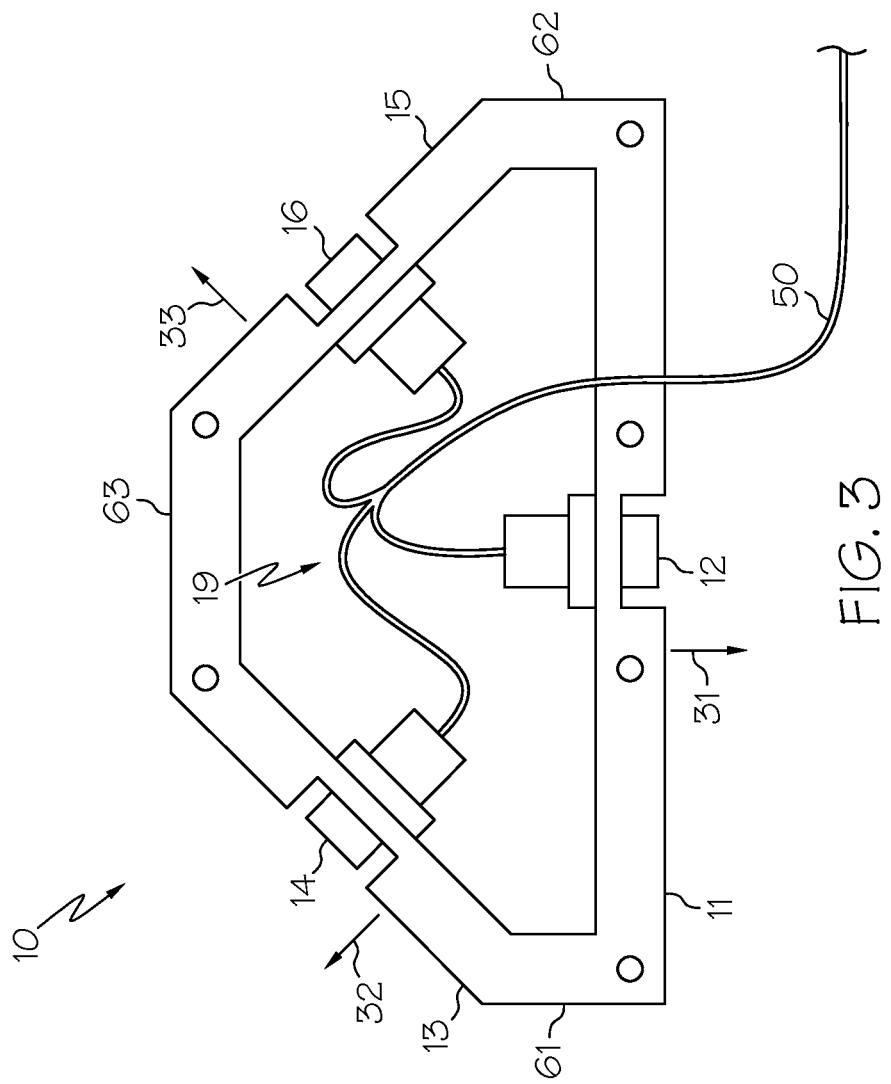
FIG. 3 depicts a profile of a first chock of a vehicle chocking system according to one or more embodiments shown and described herein.
Figure 4:
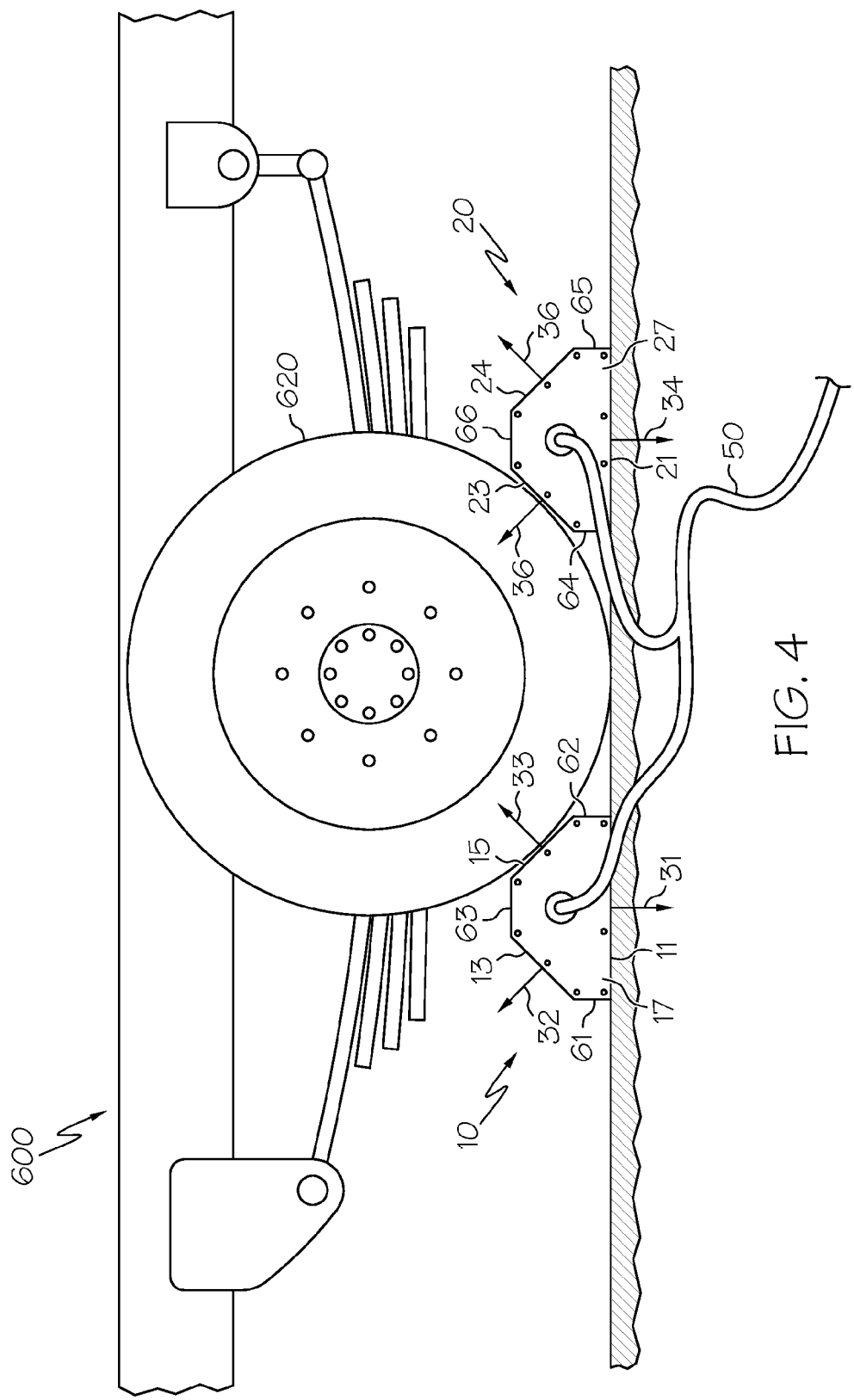
FIG. 4 depicts a vehicle chocking system positioned proximate a wheel of a vehicle according to one or more embodiments shown and described herein.

Referring now to FIGS. 2-4, a first chock 10 and second chock 20 according to at least one embodiment of a vehicle chocking system 100 are schematically depicted. The first chock 10 may generally comprise a first bottom surface 11 and two wheel restraining surfaces 13, 15 connected directly or indirectly to the first bottom surface 11. For example, the first chock 10 may comprise a first front wheel restraining surface 13 and a first rear wheel restraining surface 15 opposite the first front wheel restraining surface 13 as illustrated in FIG. 2. As used herein, the first front wheel restraining surface 13 is opposite the first rear wheel restraining surface 15 when the two surfaces are disposed on different sides of the center line $C_{L1}$ and face in diverging directions (i.e., the first front direction 32 diverges from the first rear direction 33). The first bottom surface 11 may comprise a flat base which, when in contact with the ground, defines the upright orientation of the first chock 10. In one embodiment, the first bottom surface 11 may be wider than the first front wheel restraining surface 13 and the first rear wheel restraining surface 15. In another embodiment (not shown), the first bottom surface 11 may be coated with an additional material such as rubber or a similar material to inhibit slippage of the first chock 10 relative to the ground. In yet another embodiment (not shown), the first bottom surface 11 may comprise a textured surface such as, for example rubber or metallic teeth, to prevent slippage of the first chock 10 relative to the ground. Such embodiments may provide additional resistance to the movement of a wheel 620 when the first chock 10 is positioned proximate the wheel 620 as will be described in more detail herein.

The first front wheel restraining surface 13 and the first rear wheel restraining surface 15 of the first chock 10 are connected directly or indirectly to the first bottom surface 11 such that when the first chock 10 is positioned in an upright orientation, either the first front wheel restraining surface 13 or the first rear wheel restraining surface 15 may be positioned against the wheel 620 of a vehicle, as shown, in FIG. 4. In one embodiment, the first front wheel restraining surface 13 and the first rear wheel restraining surface 15 may connect to the first bottom surface 11 via a first front intermediary wall 61 and a first rear intermediary wall 62 respectively, such as that illustrated in FIGS. 2-4. Furthermore, the first chock 10 may additionally comprise a first top wall 63 connecting the first front wheel restraining surface 13 and the first rear wheel restraining surface 15 at the top of the first chock 10. In another embodiment (not shown), the first front wheel restraining surface 13 and the first rear wheel restraining surface 15 may be symmetrical and connect directly to each other and the first bottom surface 11 such that the profile of the first chock 10 forms an isosceles triangle. In yet another embodiment (not shown), the first front wheel restraining surface 13, the first rear wheel restraining surface 15 as well as the first bottom surface 11 may all comprise symmetrical configurations and connect directly to one another such that the profile of the first chock 10 forms an equilateral triangle. The first chock 10 may otherwise comprise any other profile wherein the first front wheel restraining surface 13 and the first rear wheel restraining surface 15 taper towards a first center line $C_{L1}$ as they approach the top of the first chock 10 (such as, for example, as they approach the first top wall 63 when present). Alternatively, the first chock 10 may comprise any other profile such as a square, rectangular, trapezoidal, or any other regular geometrical or irregular geometrical profile wherein proximity sensors can be positioned on or about two separate wheel restraining surfaces 13, 15 to enable the detection of a wheel 620 when positioned adjacent the wheel 620 as will be appreciated herein. Such embodiments allows for the uniform securement of a wheel 620 when either the first front wheel restraining surface 13 or the first rear wheel restraining surface 15 is placed against the wheel 620.

Furthermore, in one embodiment, the first front wheel restraining surface 13 and/or the first rear wheel restraining surface 15 may include a surface enhancement to assist in preventing unwanted movement of the wheel 620 when the wheel 620 is against the first front wheel restraining surface 13 or the first rear wheel restraining surface 15. The surface enhancement may comprise, for example, any tactile and/or textured surface (e.g., a rubber surface) that may increase the amount of friction between the wheel 620 and the first front wheel restraining surface 13 or the first rear wheel restraining surface 15.

Referring now to FIGS. 2-4, the first chock 10 may further comprise a first plurality of proximity sensors 12, 14, 16. Specifically, the first bottom surface 11 can comprise a first bottom surface proximity sensor 12, the first front wheel restraining surface 13 can comprise a first front wheel restraining surface proximity sensor 14, and the first rear wheel restraining surface 15 can comprise a first rear wheel restraining surface 16. The first plurality of proximity sensors 12, 14, 16 may comprise any device operable to detect when an object (such as a wheel 620) or a surface (such as the ground) abuts or is in close proximity with the surface of the first bottom surface 11 or the wheel restraining surfaces 13, 15 of the first chock 10. The first plurality of proximity sensors 12, 14, 16 in each of the first bottom surface 11, the first front wheel restraining surface 13 and the first rear wheel restraining surface 15 may comprise the same or similar types of proximity sensors 12, 14, 16. Alternatively, the first plurality of proximity sensors 12, 14, 16 may be different types of sensors (such as where the first front wheel restraining surface proximity sensor 14 and the first rear wheel restraining surface proximity sensor 16 comprise a first type of proximity sensor different than the first bottom surface proximity sensor 12). Examples of suitable proximity sensors include, without limitation: capacitive proximity sensors, current proximity sensors, magnetic proximity sensors, acoustic proximity sensors and similar types of proximity sensors. Alternatively, the proximity sensors may comprise an electric device or a mechanical device which outputs an electrical signal when contacted by another object, such as, for example a switch. In one embodiment, one or more of the first plurality of proximity sensors 12, 14, 16 of the first chock 10 may comprise pressure plates that output an electrical signal when a certain level of pressure is applied to the pressure plate. In another embodiment, one or more of the first plurality of proximity sensors 12, 14, 16 may comprise sensors that emit a field to detect the presence of an object based on the return of the emitted field (such as sonar, radar or magnetic proximity sensors). In yet another embodiment, one or more of the first plurality of proximity sensors 12, 14, 16 may comprise an optical sensor that detects the presence of an object when light no longer reaches the sensor. In one specific embodiment, the first plurality of proximity sensors 12, 14, 16 comprise non-metallic proximity sensors that detect the presence of an object or surface without relying on the presence of metal in the object or surface. It should be appreciated that this list of exemplary proximity sensors is in no way meant to be exhaustive and that other proximity sensors may alternatively or additionally be employed to detect the presence of an object or surface against the first bottom surface 11, the first front wheel restraining surface 13 or the first rear wheel restraining surface 15.

The first plurality of proximity sensors 12, 14, 16 may thereby detect the presence of a surface or object about three different directions 31, 32, 33 about the first chock 10. Specifically, each of the first plurality of proximity sensors 12, 14, 16 will become "engaged" (i.e., detect the presence of a surface or object) when a surface or object abuts or is in close proximity with the wall in which that specific proximity sensor 12, 14, 16 is incorporated. The first bottom surface proximity sensor 12 may detect whether there is ground in the first downward direction 31. This ensures the first chock 10 is properly oriented against the ground in the upright orientation when placed adjacent a wheel 620. The first front wheel restraining surface proximity sensor 14 detects the presence of an object (such as a wheel 620) in the first front direction 32. Likewise, the first rear wheel restraining surface proximity sensor 16 may detect the presence of an object (such as a wheel 620) in the first rear direction 33. The first front wheel restraining surface proximity sensor 14 and the first rear wheel restraining surface proximity sensor 16 may thereby be used to determine the presence of a wheel 620 against one of the walls of the first chock 10.

Each of the first plurality of proximity sensors 12, 14, 16 may be disposed in or on the first chock 10 to respectively identify the presence of a surface or object in the first downward direction 31, the first front direction 32 or the first rear direction 33. In one embodiment, such as where the first chock 10 comprises a first cavity 19, the first plurality of proximity sensors 12, 14, 16 may be positioned in the first cavity 19 and proximate to their respective walls (such as illustrated in FIGS. 2-3). In another embodiment, part or all of each of the first plurality of proximity sensors 12, 14, 16 may be integral with their respective walls such that part of each proximity sensor is exposed on the outside surface (such as illustrated in FIG. 3). In yet another embodiment, such as where each of the first plurality of proximity sensors 12, 14, 16 comprise pressure pads, the proximity sensors 12, 14, 16 may be positioned on the outside surfaces of their respective walls. Each of the first plurality of proximity sensors 12, 14, 16 may additionally or alternatively be positioned outside of its respective wall, behind its respective wall, integral with its respective wall or any combination thereof.

Referring to FIG. 2, the first chock 10 may further comprise a first outer face plate 17 and a first inner face plate 18 enclosing the first cavity 19 of the first chock 10. In one embodiment, the first inner face plate 18 and/or the first outer face plate 17 may be removable in order to permit access to the first cavity 19 of the first chock 10 (such as illustrated in FIG. 3). In such an embodiment, the first plurality of proximity sensors 12, 14, 16 may be housed within the first cavity 19 of the first chock 10. In another embodiment, a tether 40 can be coupled to the first outer face plate 17 such that when the first chock 10 is secured next to a wheel 620, the first outer face plate 17 faces away from the vehicle so that the tether 40 runs away from the vehicle (as illustrated in FIG. 4). The tether 40 may be secured to the first outer face plate 18 by bolts, screws, knots, clasps or any other operable securement method.

Likewise, referring to FIGS. 2 and 4, the second chock 20 of the vehicle chocking system 100 may be substantially similar or identical to the first chock 10. For example, the second chock 20 may also generally comprise a second bottom surface 21 and two wheel restraining surfaces 23, 25 connected directly or indirectly to the second bottom surface 21. For example, the second chock 20 may comprise a second front wheel restraining surface 23 and a second rear wheel restraining surface 25 opposite the second front wheel restraining surface 23 as illustrated in FIG. 2. As used herein, the second front wheel restraining surface 23 is opposite the second rear wheel restraining surface 25 when the two surfaces are disposed on different sides of the center line $C_{L2}$ and face in diverging directions (i.e., the second front direction 35 diverges from the second rear direction 36). The second bottom surface 21 may comprise a flat base which, when in contact with the ground, defines the upright orientation of the second chock 20. In one embodiment, the second bottom surface 21 may be wider than the second front wheel restraining surface 23 and the second rear wheel restraining surface 25. In another embodiment (not shown), the second bottom surface 21 may be coated with an additional material such as rubber or a similar material to inhibit slippage of the second chock 20 relative to the ground. In yet another embodiment (not shown), the second bottom surface 21 may comprise a textured surface such as, for example rubber or metallic teeth, to prevent slippage of the second chock 20 relative to the ground. Such embodiments may provide additional resistance to the movement of a wheel 620 when the second chock 20 is positioned proximate the wheel 620 as will be described in more detail herein.

The second front wheel restraining surface 23 and the second rear wheel restraining surface 25 of the second chock 20 are connected directly or indirectly to the second bottom surface 21 such that when the second chock 20 is positioned in an upright orientation, either the second front wheel restraining surface 23 or the second rear wheel restraining surface 25 may be positioned against the wheel 620 of a vehicle, as shown, in FIG. 4. In one embodiment, the second front wheel restraining surface 23 and the second rear wheel restraining surface 25 may connect to the second bottom surface 21 via a second front intermediary wall 64 and a second rear intermediary wall 65 respectively, such as that illustrated in FIGS. 2-4. Furthermore, the second chock 20 may additionally comprise a second top wall 65 connecting the second front wheel restraining surface 23 and the second rear wheel restraining surface 25 at the top of the second chock 20. In another embodiment (not shown), the second front wheel restraining surface 23 and the second rear wheel restraining surface 25 may be symmetrical and connect directly to each other and the second bottom surface 21 such that the profile of the second chock 20 forms an isosceles triangle. In yet another embodiment (not shown), the second front wheel restraining surface 23, the second rear wheel restraining surface 25 as well as the second bottom surface 21 may all comprise symmetrical configurations and connect directly to one another such that the profile of the second chock 20 forms an equilateral triangle. The second chock 20 may otherwise comprise any other profile wherein the second front wheel restraining surface 23 and the second rear wheel restraining surface 25 taper towards a second center line $C_{L2}$ as they approach the top of the second chock 20 (such as, for example, as they approach the second top wall 65 when present). Alternatively, the second chock 20 may comprise any other profile such as a square, rectangular, trapezoidal, or any other regular geometrical or irregular geometrical profile wherein proximity sensors can be positioned on or about two separate wheel restraining surfaces 23, 25 to enable the detection of a wheel 620 when positioned adjacent the wheel 620 as will be appreciated herein. Such embodiments allows for the uniform securement of a wheel 620 when either the second front wheel restraining surface 23 or the second rear wheel restraining surface 25 is placed against the wheel 620.

Furthermore, in one embodiment, the second front wheel restraining surface 23 and/or the second rear wheel restraining surface 25 may include a surface enhancement to assist in preventing unwanted movement of the wheel 620 when the wheel 620 is against the second front wheel restraining surface 23 or the second rear wheel restraining surface 25. The surface enhancement may comprise, for example, any tactile and/or textured surface (e.g., a rubber surface) that may increase the amount of friction between the wheel 620 and the second front wheel restraining surface 23 or the second rear wheel restraining surface 25.

Referring now to FIGS. 2 and 4, the second chock 20 may further comprise a second plurality of proximity sensors 22, 24, 26. Specifically, the second bottom surface 21 can comprise a second bottom surface proximity sensor 22, the second front wheel restraining surface 23 can comprise a second front wheel restraining surface proximity sensor 24, and the second rear wheel restraining surface 25 can comprise a second rear wheel restraining surface 26. The second plurality of proximity sensors 22, 24, 26 may comprise any device operable to detect when an object (such as a wheel 620) or a surface (such as the ground) abuts or is in close proximity with the surface of the second bottom surface 21 or the wheel restraining surfaces 23, 25 of the second chock 20. The second plurality of proximity sensors 22, 24, 26 in each of the second bottom surface 21, the second front wheel restraining surface 23 and the second rear wheel restraining surface 25 may comprise the same or similar types of proximity sensors 22, 24, 26. Alternatively, the second plurality of proximity sensors 22, 24, 26 may be different types of sensors (such as where the second front wheel restraining surface proximity sensor 24 and the second rear wheel restraining surface proximity sensor 26 comprise a second type of proximity sensor different than the second bottom surface proximity sensor 22). Examples of suitable proximity sensors include, without limitation: capacitive proximity sensors, current proximity sensors, magnetic proximity sensors, acoustic proximity sensors and similar types of proximity sensors. Alternatively, the proximity sensors may compromise an electric device or a mechanical device which outputs an electrical signal when contacted by another object, such as, for example, a switch. In one embodiment, one or more of the second plurality of proximity sensors 22, 24, 26 of the second chock 20 may comprise pressure plates that output an electrical signal when a certain level of pressure is applied to the pressure plate. In another embodiment, one or more of the second plurality of proximity sensors 22, 24, 26 may comprise sensors that emit a field to detect the presence of an object based on the return of the emitted field (such as sonar, radar or magnetic proximity sensors). In yet another embodiment, one or more of the second plurality of proximity sensors 22, 24, 26 may comprise an optical sensor that detects the presence of an object when light no longer reaches the sensor. In one specific embodiment, the second plurality of proximity sensors 22, 24, 26 comprise non-metallic proximity sensors that detect the presence of an object or surface without relying on the presence of metal in the object or surface. It should be appreciated that this list of exemplary proximity sensors is in no way meant to be exhaustive and that other proximity sensors may alternatively or additionally be employed to detect the presence of an object or surface against the second bottom surface 21, the second front wheel restraining surface 23 or the second rear wheel restraining surface 25.

The second plurality of proximity sensors 22, 24, 26 may thereby detect the presence of a surface or object about three different directions about the second chock 20. Specifically, each of the second plurality of proximity sensors 22, 24, 26 will become "engaged" (i.e., detect the presence of a surface or object) when a surface or object abuts or is in close proximity with the wall in which that specific proximity sensor 22, 24, 26 is incorporated. The second bottom surface proximity sensor 22 may detect whether there is ground in the second downward direction 34. This ensures the second chock 20 is properly oriented against the ground in the upright orientation when placed adjacent a wheel 620. The second front wheel restraining surface proximity sensor 24 detects the presence of an object (such as a wheel 620) in the second front direction 35. Likewise, the second rear wheel restraining surface proximity sensor 26 may detect the presence of an object (such as a wheel 620) in the second rear direction 36. The second front wheel restraining surface proximity sensor 24 and the second rear wheel restraining surface proximity sensor 26 may thereby be used to determine the presence of a wheel 620 against one of the walls of the second chock 20.

Each of the second plurality of proximity sensors 22, 24, 26 may be disposed in or on the second chock 20 to respectively identify the presence of a surface or object in the second downward direction 34, the second front direction 35 or the second rear direction 36. In one embodiment, such as where the second chock 20 comprises a second cavity, the second plurality of proximity sensors 22, 24, 26 may be positioned in the second cavity and proximate to their respective walls. In another embodiment, part or all of each of the second plurality of proximity sensors 22, 24, 26 may be integral with their respective walls such that part of each proximity sensor is exposed on the outside surface. In yet another embodiment, such as where each of the second plurality of proximity sensors 22, 24, 26 comprise pressure pads, the proximity sensors 22, 24, 26 may be positioned on the outside surfaces of their respective walls. Each of the second plurality of proximity sensors 22, 24, 26 may additionally or alternatively be positioned outside of its respective wall, behind its respective wall, integral with its respective wall or any combination thereof.

Referring to FIG. 2, the second chock 20 may further comprise a second outer face plate 17 and a second inner face plate 18 enclosing the second cavity of the second chock 20. In one embodiment, the second inner face plate 18 and/or the second outer face plate 17 may be removable in order to permit access to the second cavity of the second chock 20 (such as illustrated in FIG. 3). In such an embodiment, the second plurality of proximity sensors 22, 24, 26 may be housed within the second cavity of the second chock 20. In another embodiment, a tether 40 can be coupled to the second outer face plate 17 such that when the second chock 20 is secured next to a wheel 620, the second outer face plate 17 faces away from the vehicle so that the tether 40 runs away from the vehicle (as illustrated in FIG. 4). The tether 40 may be secured to the second outer face plate 18 by bolts, screws, knots, clasps or any other operable securement method.

The first chock 10 and the second chock 20 may further comprise any material or materials enabling the first chock and the second chock 20 to inhibit the movement of a wheel secured between the two. For example, the first chock 10 and the second chock 20 may comprise, alone or in combination, a metal, composite, polymeric, rubber or any other suitable material. Furthermore, each wall of each chock (i.e., the first bottom surface 11, the first front wheel restraining surface 13 and the first rear wheel restraining surface 15 of the first chock 10 as well as the second bottom surface 21, the second front wheel restraining surface 23 and the second rear wheel restraining surface 25 of the second chock 20) may comprise the same material, different materials or combinations thereof. In one embodiment, the first chock 10 and/or the second chock 20 can be formed from a single piece of material. In another embodiment, the first chock 10 and/or the second chock 20 can be formed from a plurality of materials molded or secured together to form the first chock 10 or second chock 20.

Referring to FIG. 2, the first chock 10 and the second chock 20 can be physically tethered together via a tether 40 such that the first chock 10 is connected to the second chock 20. For example, as illustrated in FIG. 2, the first outer face plate 17 of the first chock 10 may connect to a first end of the tether 40 and the second outer face plate 27 of the second chock 20 may connect to the second end of the tether 40. By connecting the tether 40 between the first outer face plate 17 of the first chock 10 and the second outer face plate 27 of the second chock 20, the first chock 10 and the second chock 20 have a specific relative alignment when used to properly secure a wheel 620. Specifically, by ensuring that the first outer face plate 17 and the second outer face plate 27 both face away from a vehicle when secured around a wheel 620 (such as illustrated in FIG. 4), the first front wheel restraining surface 13 of the first chock 10 will face in the same direction as the and the second front wheel restraining surface 23 of the second chock 20. This alignment may assist in determining whether opposing wheel restraining surfaces (i.e., wheel restraining surfaces substantially facing each other) of the first chock 10 and the second chock 20 are engaged as will be described in more detail herein. The tether 40 may comprise a nylon material such as a nylon rope, a metallic material such as a metal chain or cable, or any other suitable material.

Referring again to FIG. 1, the vehicle chocking system 100 may further comprise a controller 90 to determine the engaged status of each of the proximity sensors relative to the others as will become appreciated herein. The controller 90 comprises a processor 91 and a memory 92 for storing a computer readable and executable instructions to determine the relative engaged status of the proximity sensors and send an approval signal if it determines that the wheel is properly secured. The first chock 10 and the second chock 20 (and more specifically, the first bottom surface proximity sensor 12, the first front wheel restraining surface proximity sensor 14, the first rear wheel restraining sensor 16, the second bottom surface proximity sensor 22, the second front wheel restraining surface proximity sensor 24, and the second rear wheel restraining sensor 26) can be communicatively coupled to the controller 90. As used herein, "communicatively coupled" refers to the controller 90 being operable to receive signals from each of the proximity sensors 12, 14, 16 of the first chock 10 and each of the proximity sensors 22, 24, 26 of the second chock 20, the received signals being generally indicative of the proximity sensors being engaged or disengaged with another object. In one embodiment, such as that illustrated in FIGS. 3-5, a communication link 50 that communicatively couples the controller 90 to the first chock 10 and the second chock 20 may comprise an electrical communication line. In such an embodiment, the communication link 50 may be incorporated in the tether 40, or may include a separate line. In an alternative embodiment, the first chock 10 and the second chock 20 may be communicatively coupled to the control until wirelessly. For example, the chocks 10, 20 may include wireless transmitters electrically coupled to the proximity sensors and the controller may compromise a transceiver for sending and/or receiving signals including receiving signals from the chocks. In such an embodiment, the first chock 10 and second chock 20 may each comprise one or more transmitters operable to indicate the engaged or disengaged status of each of the proximity sensors (that is, whether each of the proximity sensors detects the presence of a surface or object).

Figure 5:
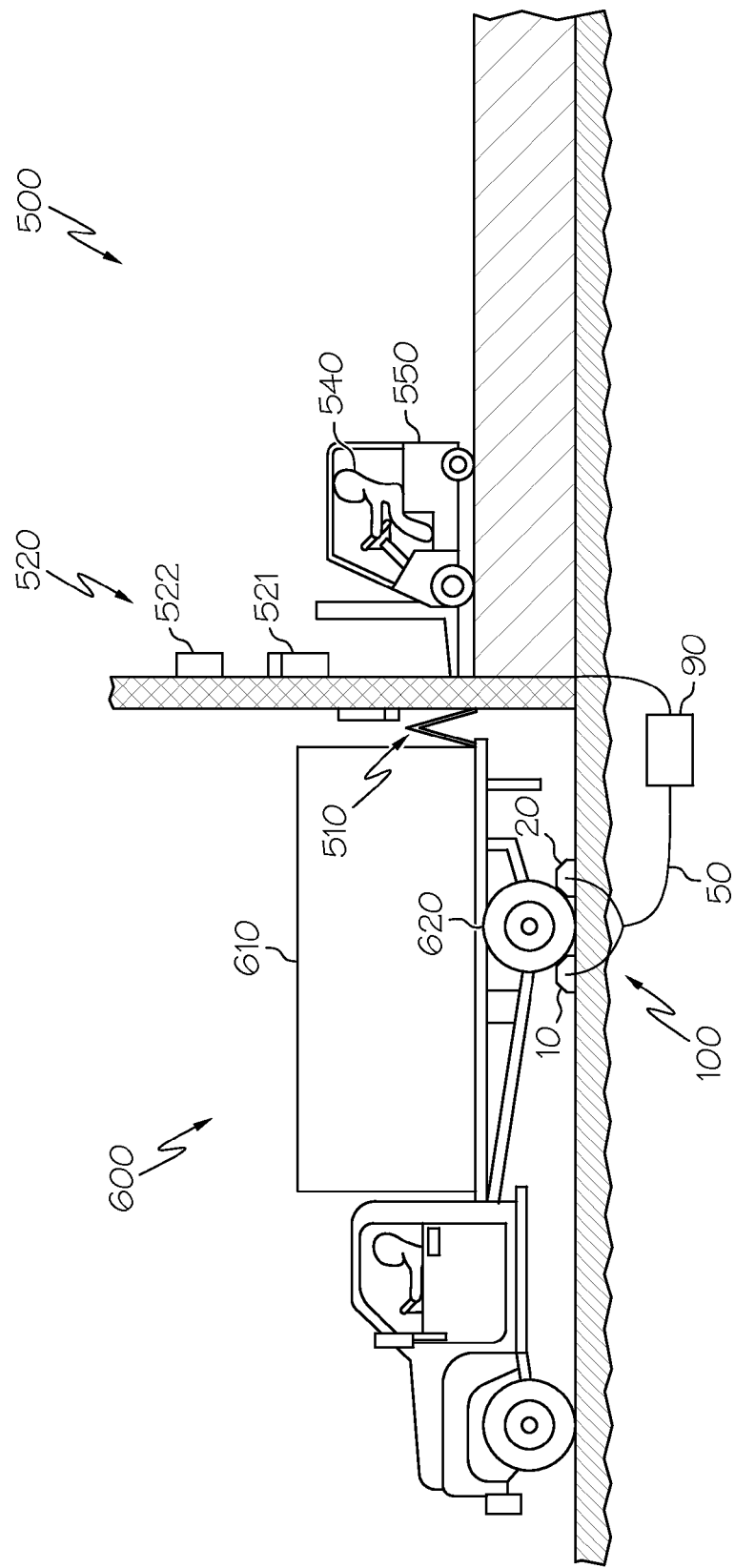
FIG. 5 depicts a vehicle chocking system incorporated with a wheel of a vehicle at a loading bay according to one or more embodiments shown and described herein.

Referring specifically to FIGS. 1 and 5, in one embodiment, the vehicle chocking system 100 can comprise only the first chock 10, the second chock 20 and the controller 90. In another embodiment, the vehicle chocking system 100 can further comprise a gate device 510, a signal device 520 and/or any similar part of a loading bay 500. The gate device 510 may comprise any device which may be operated to impede the path to the cargo area 610 of the vehicle 600. For example, the gate device 510 may comprise a ramp, gate, door, bridge or similar structure that can create or block the path between the vehicle 600 and the loading bay 500. The signal device 520 may comprise any device operable to signal the secured or unsecured status of the first chock 10 and the second chock 20. For example, the signal device 520 may comprise a visual alarm 521 (e.g., a light) that illuminates a positive color when the wheel 620 is properly secured, and/or an audible alarm (e.g., a horn) that sounds a positive signal when the wheel 620 is properly secured. The controller 90 can control the gate device 510 and/or the signal device 520 based on the status of the first plurality of proximity sensors 12, 14, 16 in the first chock 10 and the second plurality of proximity sensors 22, 24, 26 in the second chock.

The controller 90 may be integrated with the first chock 10 or the second chock 20, integrated with a loading bay 500 (i.e., part of a larger "loading bay" control system), or as an independent device that links the first chock 10 and the second chock 20 to a loading bay 500. For example, in one embodiment, the controller 90 may be disposed within or about the first chock 10 or the second chock 20. In such an embodiment, the controller may specifically be disposed within the first cavity 19 or about the first outer face plate 17 or the first inner face plate 18 of the first chock 10, or likewise, within the second cavity or about the second outer face plate 27 or the second inner face plate 28 of the second chock 20. Such exemplary locations could provide for the positioning of the controller that would not interfere with a wheel 620 disposed directly against the front wheel restraining surfaces 13, 23 or the rear wheel restraining surfaces 15, 23 of the first chock 10 and second chock 20 respectively. In another embodiment, the controller 90 may be independent from the first chock 10 and the second chock 20 such as when it comprises a stand-alone computer or a computer integrated with a loading bay 500. In such an embodiment, the first chock 10 and the second chock 20 may be linked with the controller 90 prior to securing the first chock 10 and second chock 20 about a wheel 620 such that correct chocks are linked with the correct loading bay 500. In yet another embodiment, a loading bay 500 may comprise a single controller 90 that is shared by a plurality of pairs of first chocks 10 and second chocks 20 such that the controller may independently determine the relative engaged status of the proximity sensors for each pair of chocks.

By determining the status (i.e. engaged, disengaged) of the individual proximity sensors, the controller 90 can verify that the wheel 620 is properly secured wherein the first chock 10 is positioned against or near the front or rear side of the wheel 620 and the second chock is positioned against or near the opposite side of the wheel 620. Specifically, the controller 90 can determine that the wheel 620 is properly secured by the first chock 10 and the second chock 20 by verifying that both the first bottom surface 11 and the second bottom surface 21 are against the ground and that opposing wheel restraining surfaces of the first chock 10 and the second chock 20 are engaged. As used herein, "opposing wheel restraining surfaces" refers to wheel restraining surfaces of the first chock 10 and the second chock 20 that substantially face each other when the wheel chocks are both in upright positions. With reference to Table 1 presented below, satisfactory conditions are listed where the controller 90 would determine the wheel 620 is properly secured based on the status of the various proximity sensors. In both Condition #1 and Condition #2, both the first bottom surface proximity sensors and the second bottom surface proximity sensor are engaged. Additionally, opposing wheel restraining surfaces are engaged. In Condition #1, the first front wheel restraining surface proximity sensor and the second rear wheel restraining surface proximity sensors are engaged, and in Condition #2, the first rear wheel restraining surface proximity sensor and the second front wheel restraining surface proximity surface are engaged.

TABLE 1

Examplary Satisfying Conditions for Proper Securement of a Wheel

| | First Chock | | | Second Chock | | |
|---|---|---|---|---|---|---|
| Satisfying Condition | First Bottom Surface Proximity Sensor | First Front Wheel Restraining Surface Proximity Sensor | First Rear Wheel Restraining Surface Proximity Sensor | Second Bottom Surface Proximity Sensor | Second Front Wheel Restraining Surface Proximity Sensor | Second Rear Wheel Restraining Surface Proximity Sensor |
| Condition #1 | Engaged | Engaged | Disengaged | Engaged | Disengaged | Engaged |
| Condition #2 | Engaged | Disengaged | Engaged | Engaged | Disengaged | Engaged |

In cooperation with the first chock 10 and the second chock 20, and more specifically the first plurality of proximity sensors 12, 14, 16 in the first chock 10 and the second plurality of proximity sensors 22, 24, 26 in the second chock 20, the controller 90 may verify that the wheel 620 is properly secured through a variety of logical processes. For example, with reference to FIGS. 5 and 6, in one embodiment, a first method 110 for verifying wheel securement may first comprise setting the first chock 10 and the second chock 20 in step 111. The controller 90 may also start with an initial status of locked in step 112 wherein the locked status can prevent the sending of an approval signal such that loading or unloading of the vehicle 600 will not occur. For example, the gate device 510 may impede the path to the cargo area and/or the signal device and ? a warning indication when in the "locked" state. The controller 90 then determines in step 113 if the first bottom surface proximity sensor 12 and the second bottom surface proximity sensor 22 are engaged. If they are not engaged, the controller 90 remains in its initial locked state as indicated in step 112. If they are engaged, the controller 90 then determines in step 115 if either the first front wheel restraining surface proximity sensor 14 or the first rear wheel restraining surface 16 are engaged. If they are not engaged, the controller 90 remains in its initial locked state as indicated in step 112. If either proximity sensor is engaged, the controller 90 then determines in step 117 if either the second front wheel restraining surface proximity sensor 24 or the second rear wheel restraining surface proximity sensor 26 are engaged. If they are not engaged, the controller 90 remains in its initial locked state as indicated in step 112. If either proximity sensor is engaged, the controller 90 then determines in step 118 if the first front wheel restraining proximity sensor 14 and the second rear wheel restraining surface proximity sensor 26 are both engaged. If they are both engaged, the controller 90 sends an approval signal in step 116 indicating the secured status of the wheel such that loading or unloading of the vehicle 600 can occur. If both proximity sensors are not engaged, the controller 90 determines in step 119 if the first wheel restraining surface proximity sensor 16 and the second front wheel restraining surface proximity sensor 24 are engaged. If they are both engaged, the controller 90 sends an approval signal in step 116 indicating the secured status of the wheel such that loading or unloading of the vehicle 600 can occur. If they are not engaged, the controller 90 remains in its initial locked state as indicated in step 112.

Figure 7:
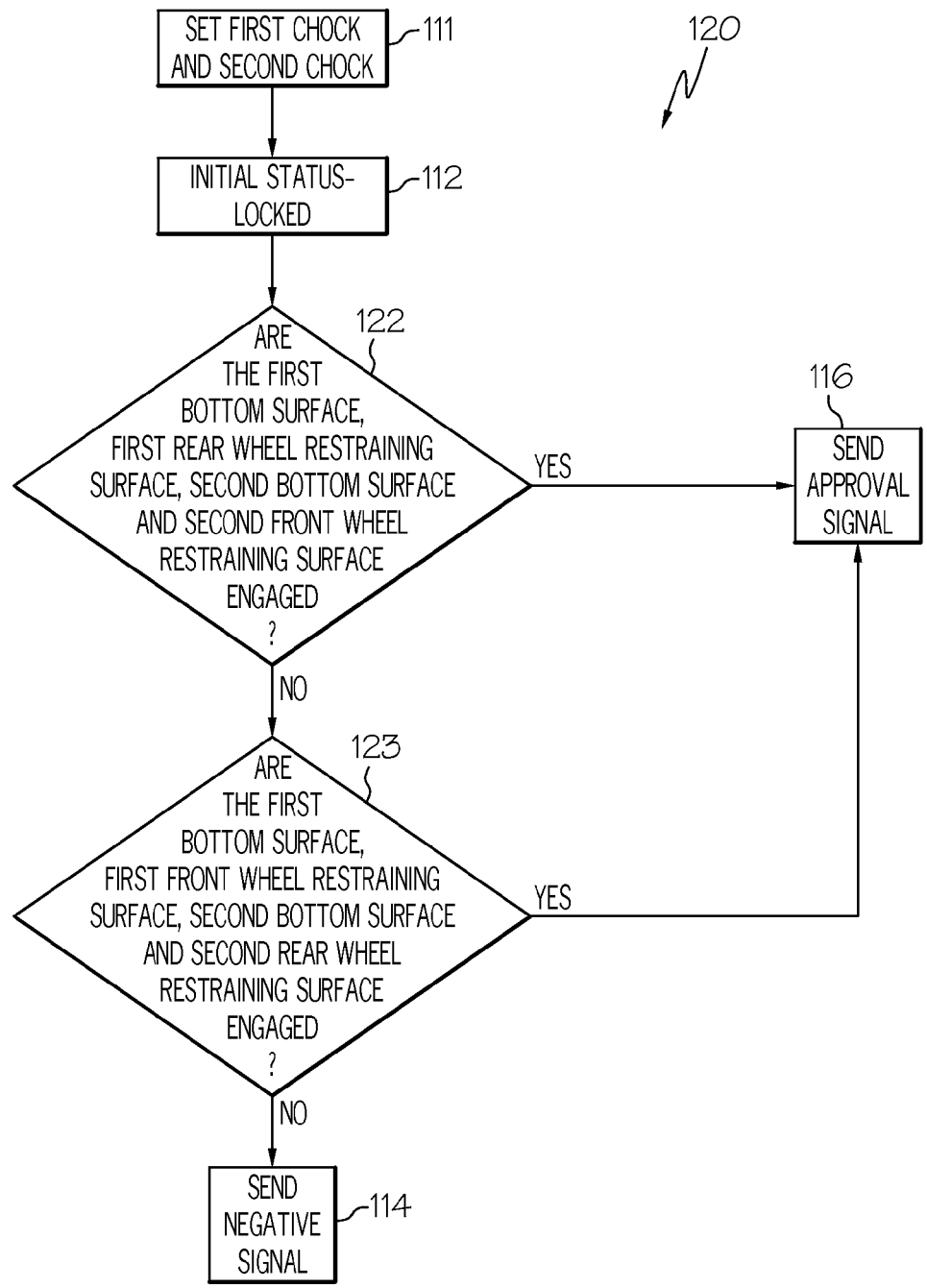
FIG. 7 is a flow chart of a second method for verifying the proper securement of a wheel using a vehicle chocking system according to one or more embodiments shown and described herein.

Referring to FIGS. 5 and 7, in another embodiment, a second method 120 for verifying wheel securement may similarly first comprise setting the first chock 10 and the second chock 20 in step 111. The controller 90 may also start with an initial state of locked in step 112 wherein the locked state can prevent the sending of an approval signal such that loading or unloading of the vehicle 600 will not occur. The controller then determines in steps 122 and 123 whether one of two conditions are met that would indicate proper securement. Specifically, the controller 90 first determines in step 122 whether the first bottom surface proximity sensor 12 and the first rear wheel restraining surface proximity sensor 16 of the first chock 10 as well as the second bottom surface proximity sensor 22 and the second front wheel restraining surface proximity sensor 24 of the second chock 20 are engaged. If the determination is affirmative, then an approval signal is sent in step 116 similar to that in the first method 110. If the determination in step 122 is negative, the controller 90 proceeds to determine in step 123 whether the first bottom surface proximity sensor 12 and the first front wheel restraining surface proximity sensor 14 of the first chock 10 as well as the second bottom surface proximity sensor 22 and the second rear wheel restraining surface proximity sensor 26 of the second chock 20 are engaged. If the determination is affirmative, then an approval signal is sent in step 116 similar to that in the first method 110. If the determination in step 122 is negative, then the negative signal is sent in step 114. Alternatively sending a negative signal in step 114 may instead comprise sending no signal (and specifically not sending an approval signal) such that the controller 90 remains in its initial locked state as indicated in step 112.

It should be appreciated that these methods for verifying wheel securement are exemplary only and alternative methods may alternatively be employed such that it is verified that the proximity sensors of the first bottom surface 11 and the second bottom surface 21 are engaged as well as the proximity sensors of opposing wheel restraining surfaces are engaged.

Figure 6:
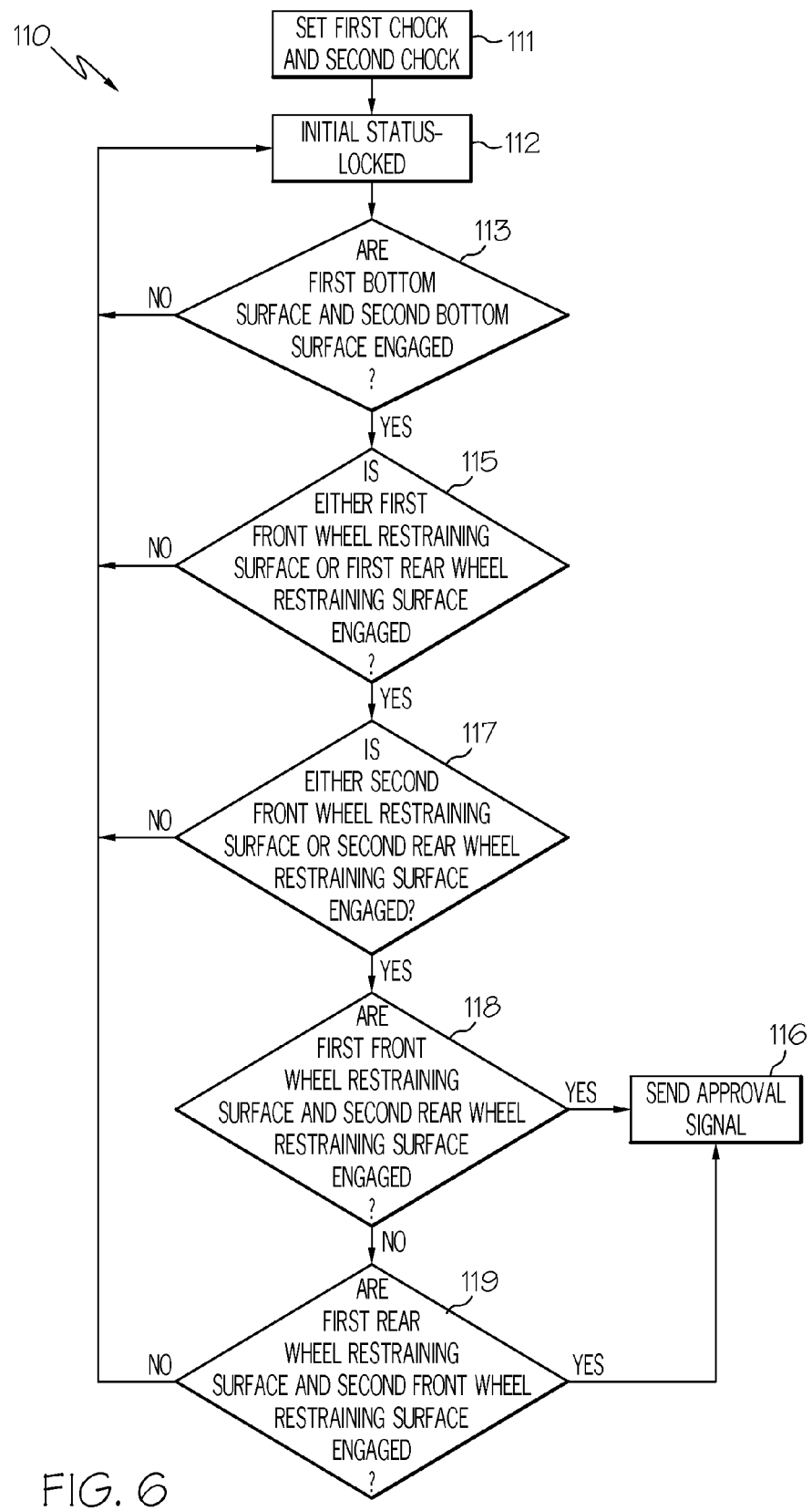
FIG. 6 is a flow chart of a first method for verifying the proper securement of a wheel using a vehicle chocking system according to one or more embodiments shown and described herein.

As mentioned above, once the vehicle chocking system verifies wheel securement, an approval signal is transmitted from the controller (such as indicated in steps 116 in FIGS. 5 and 6). Referring to FIGS. 1 and 5, the approval signal may comprise any physical or electrical output that either enables the loading or unloading of cargo in a vehicle 600 or alerts the securement status to operators 540 in and/or around the vehicle 600. For example, in one embodiment, the approval signal may comprise transitioning or allowing a gate device 510 to transition to an open position between the loading bay 500 onto or into the cargo area 610 of the vehicle 600. The gate device 510 can comprise any type of gate, ramp, door, barrier or other apparatus that can move between an open and closed state. In FIG. 5, for example, the gate device 510 comprises a folding gate that can transition between a vertical state where the first part and second part are aligned vertically next to one another, and a horizontal state where the first part and the second part are aligned horizontally with one another to form an elongated ramp. Specifically, when in the closed state, the gate device 510 would prevent or deter access between the loading bay 500 and the cargo area 610 of the vehicle 600. Conversely, when in the open state, the gate device 500 would enable or encourage access between the loading bay 500 and the cargo area 610 of the vehicle 600.

In another embodiment, the approval signal may additionally or alternatively comprise activating a signal device 520 such as a visual alarm 521 and/or an audible alarm 522 that indicates to operators 540 that the wheel 620 of the vehicle 600 is properly secured. Likewise, if the controller 90 determines the wheel 620 is not properly secured, then a negative signal may be sent (such as indicated in step 114 in FIG. 7). The negative signal may comprise transitioning the gate device 510 from the open position to the closed position, activating or deactivating the visual alarm 521 and/or the audible alarm 522 to indicate the negative status to operators 540, or simply interrupting the sending of the approval signal. It should be appreciated that any other alternative processes and indicators may alternatively or additional be employed through the sending of approval signals and negative signals to indicate the securement status of the wheel 620 via the first chock 10 and the second chock 20.

Referring to FIGS. 4, 5 and 7 to illustrate the vehicle chocking systems, the following example is provided. In operation, a vehicle 600 transporting cargo is docked in a loading bay 500 of a warehouse to unload its cargo. The vehicle 600 is backed in so that the rear of the vehicle faces and is in close proximity with the loading bay 500. Before the loading ramp 510 of the loading bay 500 can be lowered into the loading position, one of the wheels 620 of the vehicle 600 must be secured using the vehicle chocking system 100. Thus, as indicated in step 111 of method 120, a first chock 10 and a second chock 20 of a vehicle chocking system 100 are employed around an individual wheel 620 of the vehicle 600 to inhibit unwanted forward or backward movement of the vehicle 600. The first chock 10 is placed in front of the wheel 620 such that the first outer face plate 17 faces away from the vehicle 600, the first bottom surface 11 is against the ground, and the first rear wheel restraining surface 15 is against the front of the wheel 620. As a result of the positioning of the first chock 10, the first bottom surface proximity sensor 12 and the first rear wheel restraining surface proximity sensor 16 become engaged indicating the presence of an adjacent object. Similarly, the second chock 20 is placed in back of the wheel 620 such that the second outer face plate 27 faces away from the vehicle 600, the second bottom surface 21 is properly against the ground, and the second front wheel restraining surface 23 is against the rear of the wheel 620. As a result of the positioning of the second chock 20, the second bottom surface proximity sensor 22 and the second front wheel restraining surface proximity sensor 24 become engaged indicating the presence of an adjacent object. As indicated in steps 122 and 123 of method 120, the controller 90 (which is communicatively coupled to the first chock 10 and the second chock 20) determines which relative proximity sensors are engaged and verifies whether the wheel 620 is properly secured. Specifically, in step 122 of method 120, the controller 90 determines that the first bottom surface proximity sensor 12, the first rear wheel restraining surface proximity sensor 16, the second bottom surface proximity sensor 22 and the second front wheel restraining surface proximity sensor 24 are all engaged. As a result, the controller determines the first chock 10 and the second chock 20 are properly positioned about the wheel 620 to verify that the wheel 620 is properly secured. As indicated in step 116 in method 120, the controller 90 therefore sends an approval signal to the loading bay 500 which illuminates a visual alarm 522 (e.g., a green light) adjacent the gate device 510 and allows the gate device 510 of the loading bay 500 to be moved into the open position to connect with the cargo area 610 of the vehicle 600.

It should now be appreciated that securement-verifying chocks and wheel securement verification systems may be utilized to verify the proper positioning of chocks and the securement of a vehicle's wheel prior to or during the loading and/or unloading of cargo from the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle chocking system comprising:
a first chock comprising a first bottom surface, a first front wheel restraining surface and a first rear wheel restraining surface opposite the first front wheel restraining surface;
a second chock comprising a second bottom surface, a second front wheel restraining surface and a second rear wheel restraining surface opposite the second front wheel restraining surface;
wherein the first bottom surface, the first front wheel restraining surface and the first rear wheel restraining surface of the first chock and the second bottom surface, the second front wheel restraining surface and the second rear wheel restraining surface of the second chock each comprises a proximity sensor; and
wherein each of the proximity sensors are communicatively coupled to a controller comprising a processor and a memory having a computer readable and executable instructions and the processor executes the computer readable and/or executable instructions to transmits an approval signal when:
proximity sensors for the first bottom surface and the second bottom surface are both engaged such that the first and second chocks are in an upright orientation; and
either proximity sensors for the first rear wheel restraining surface and the second front wheel restraining surface are both engaged or proximity sensors for the first front wheel restraining surface and the second rear wheel restraining surface are both engaged.

2. The vehicle chocking system of claim 1 wherein the approval signal comprises activating a signal device are communicatively coupled to the controller.

3. The vehicle chocking system of claim 2 wherein the signal device comprises a visual alarm and/or an audible alarm.

4. The vehicle chocking system of claim 1 further comprising a gate device wherein the approval signal transitions the gate device from a closed position to an open position.

5. The vehicle chocking system of claim 1 wherein:
the first chock comprises a first cavity housing the proximity sensors for each of the first bottom surface, the first front wheel restraining surface and the first rear wheel restraining surface; and
the second chock comprises a second cavity housing the proximity sensors for each of the second bottom surface, the second front wheel restraining surface and the second rear wheel restraining surface.

6. The vehicle chocking system of claim 1 wherein:
the first chock comprises a first outer face plate; and
the second chock comprises a second outer face plate tethered to the first outer face plate.

7. The vehicle chocking system of claim 1 wherein the first chock and the second chock are wirelessly communicatively coupled to the controller.

8. The vehicle chocking system of claim 1 wherein either the first chock or the second chock comprises the controller.

9. A vehicle chocking system comprising:
a first chock comprising a first bottom surface with a first bottom surface proximity sensor, a first front wheel restraining surface with a first front wheel restraining surface proximity sensor, and a first rear wheel restraining surface with a first rear wheel restraining surface proximity sensor;
a second chock comprising a second bottom surface with a second bottom surface proximity sensor, a second front wheel restraining surface with a second front wheel restraining surface proximity sensor, and a second rear wheel restraining surface with a second rear wheel restraining surface proximity sensor;
a controller communicatively coupled to the first bottom surface proximity sensor, the first front wheel restraining surface proximity sensor, the first rear wheel restraining surface proximity sensor, the second bottom surface proximity sensor, the second front wheel restraining surface proximity sensor, and the second rear wheel restraining surface proximity sensor; wherein, the controller comprises a processor and a memory having a computer readable and executable instructions and the processor executes the computer readable and/or executable instructions to transmits an approval signal when:
the first bottom surface proximity sensor and the second bottom surface proximity sensor are both engaged such that the first and second chocks are in an upright orientation; and
either the first rear wheel restraining surface proximity sensor and the second front wheel restraining surface proximity sensor are both engaged or the first front wheel restraining surface proximity sensor and the second rear wheel restraining surface proximity sensor are both engaged.

10. The vehicle chocking system of claim 9 further comprising a gate device communicatively coupled to the controller, wherein the gate device transitions from a closed position to an open position based on the approval signal from the controller.

11. The vehicle chocking system of claim 9 further comprising a signal device communicatively coupled to the controller and the signal device is activated based on the approval signal transmitted from the controller.

12. The vehicle chocking system of claim 9, wherein the controller sends a warning signal negative signal if any engaged proximity sensor becomes disengaged.

13. The vehicle chocking system of claim 12, wherein the warning signal transitions a gate device from an open position to a closed position.

14. The vehicle chocking system of claim 12, wherein the warning signal changes a state of the signal device.

15. A method for verifying proper wheel securement comprising:

providing a first chock comprising a first bottom surface with a first bottom surface proximity sensor, a first front wheel restraining surface with a first front wheel restraining surface proximity sensor, and a first rear wheel restraining surface with a first rear wheel restraining surface proximity sensor;

providing a second chock comprising a second bottom surface with a second bottom surface proximity sensor, a second front wheel restraining surface with a second front wheel restraining surface proximity sensor, and a second rear wheel restraining surface with a second rear wheel restraining surface proximity sensor;

determining if either the first front wheel restraining surface proximity sensor and the second rear wheel restraining surface proximity sensor are both engaged with a wheel of a vehicle or the first rear wheel restraining surface proximity sensor and the second front wheel restraining surface proximity sensor are both engaged with the wheel of the vehicle; and sending an approval signal to verify proper securement of the wheel.

16. The method of claim 15 wherein the approval signal is sent to a gate device.

17. The method of claim 15 wherein the approval signal is sent to a signal device.

18. The method of claim 15 wherein a negative signal is sent if neither the first front wheel restraining surface proximity sensor and the second rear wheel restraining surface proximity sensor are both engaged or the first rear wheel restraining surface proximity sensor and the second front wheel restraining surface proximity sensor are both engaged.

19. The method of claim 15 wherein:

the first chock comprises a first cavity housing the first bottom surface proximity sensor, the first front wheel restraining surface proximity sensor and the first rear wheel restraining surface proximity sensor; and the second chock comprises a second cavity housing the second bottom surface proximity sensor, the second front wheel restraining surface proximity sensor and the second rear wheel restraining surface proximity sensor.

20. The method of claim 19 wherein:

the first chock comprises a first outer face plate; and the second chock comprises a second outer face plate tethered to the first outer face plate.

\* \* \* \* \*